(No Model.)
C. HEATON.
MACHINE FOR MOLDING EMERY OR OTHER PLASTIC WHEELS.
No. 374,065. Patented Nov. 29, 1887.
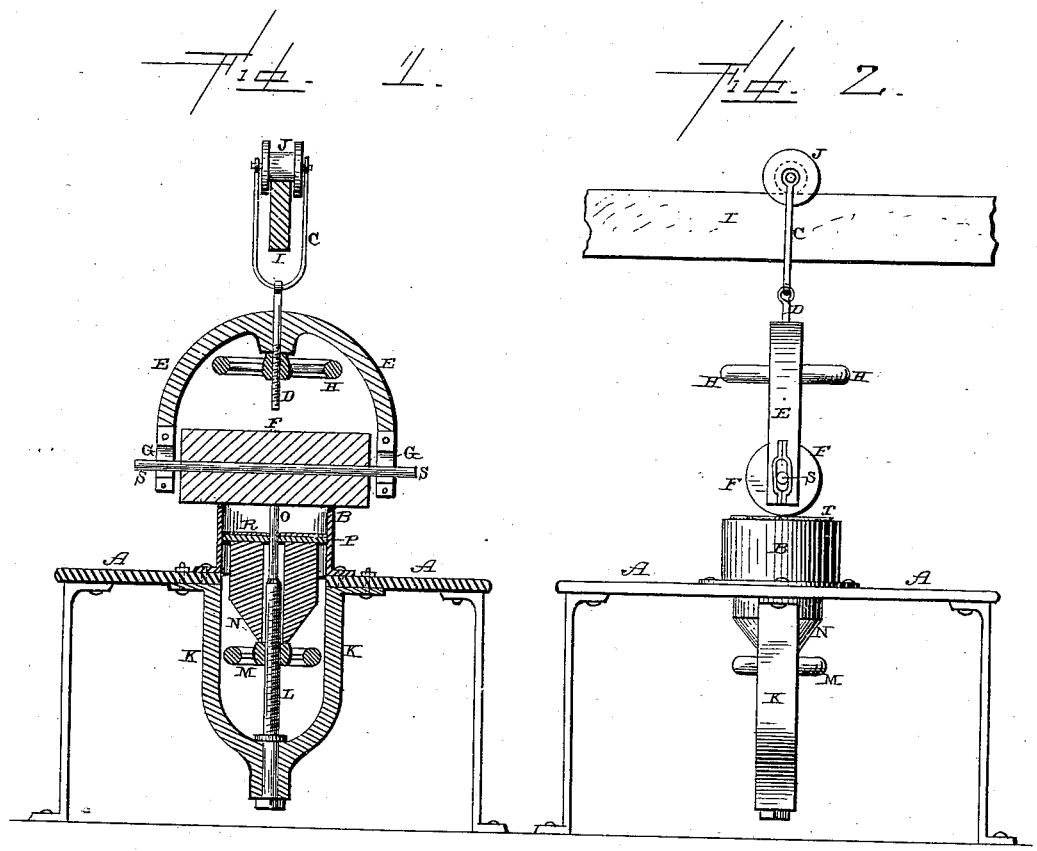
Witnesses.
L. F. Gardner
Edw. P. Ellis
Inventor:
Chas. Heaton
per J. A. Lehmann,
atty

UNITED STATES PATENT OFFICE.

CHARLES HEATON, OF BAINBRIDGE, NEW YORK.

MACHINE FOR MOLDING EMERY OR OTHER PLASTIC WHEELS.

SPECIFICATION forming part of Letters Patent No. 374,065, dated November 29, 1887.

Application filed June 21, 1887. Serial No. 242,026. (No model.)

*To all whom it may concern:*

Be it known that I, CHARLES HEATON, of Bainbridge, in the county of Chenango and State of New York, have invented certain new and useful Improvements in Machines for Molding Emery or other Plastic Wheels or Disks; and I do hereby declare the following to be a full, clear, and exact description of the invention, such as will enable others skilled in the art to which it pertains to make and use it, reference being had to the accompanying drawings, which form part of this specification.

My invention relates to an improvement in a machine for molding emery and other plastic wheels or disks, and which is intended more especially to be used for molding emery-wheels; and it consists in, first, a mold having an adjustable bottom, whereby the mixture placed in the mold will be raised, as desired, for the purpose described, and a means for compressing the mixture as it is raised above the mold; second, the combination, with the mold having an adjustable bottom, whereby the mixture placed therein may be raised above the mold, of a compressing-roller adapted to be moved back and forth over the mixture; third, the combination, with a supporting frame or table having an opening, a mold secured to the table over the opening, and provided with an adjustable bottom, of a compressing-roller supported above the mold and adapted to be moved back and forth over the mold for the purpose described, and to be moved from over the mold out of the way; fourth, the combination, with a mold having an adjustable bottom, of a compressing-roller supported above the mold and adapted to be adjusted vertically; fifth, the combination and arrangement of devices which will be more fully described hereinafter, and pointed out in the claims.

The object of my invention is to produce a machine for molding emery or other plastic wheels, which is provided with a mold of any desired shape or form having an adjustable bottom, whereby the material which is to be molded may be raised and lowered, as desired, and to use a roller of any desired weight, which is supported above the mold in a suitable frame-work, whereby the roller may be moved back and forth over the mold and compress the material placed in the mold to any desired extent, said frame-work being so supported that the pressing-roller can be moved from over the mold and out of the way for the purpose of placing the material in the mold or delivering it therefrom.

Figure 1 is a vertical section of a machine embodying my invention. Fig. 2 is a side elevation of the same.

A supporting table or frame, A, is supported a suitable distance above the floor by any desired number of legs, as shown. Secured to the top of the table or frame A is the mold B, which is placed directly over an opening in the table A, of the same size and shape as the mold itself. Secured to the under side of the table A by means of suitable bolts or screws is the U-shaped casting K, in the lower end of which is secured the screw-rod L, which passes up through the center of the U-shaped casting K, extending to a level with the top of the mold B, and thus made to form a center hole in the mixture, T, being molded. Sliding freely upon the screw-rod L is the block N, which is raised or lowered by means of the screw-threaded wheel M, placed upon the rod or shaft L. The bottom of the mold B is formed by the plate P, which may be formed of metal or any other desired material, and which rests upon the top of the block N, and is raised and lowered therewith.

Placed upon the top of the plate P is a thin metallic plate, R, which is of the same size as the bottom P, both of which fit the mold B very neatly, so as to prevent the passage of any of the material which is being pressed in the mold downward between the bottom P and the inner side of the mold. The thin metallic plate R is greased, so as to prevent any of the material which is being compressed from sticking thereto, and thus admit of the wheel which has been molded being freely removed therefrom when the bottom has been raised to or above the level of the top of the mold B by means of the wheel M.

The screw-rod L is provided with the unthreaded or smooth portion O, whereby the plate P, which forms the bottom of the mold, may be made to fit the upper portion of the rod very neatly, so as to prevent the passage of any of the material which is being molded between the rod and the bottom P.

Supported by any suitable means a suitable distance above the table A and mold B is the beam I, which carries the pressing-roller and its frame-work. Suspended from the beam I by means of the clevis C, flanged roller J, which is journaled in the upper ends of the clevis C, and the screw-rod D, is the U-shaped frame E. The upper end of the screw-rod D is linked or otherwise secured to the lower end of the clevis C, and passes loosely through a hole made in the upper portion of the frame E, and has placed upon its lower end the screw-wheel H, which bears upon the upper under portion of the frame E, by means of which the frame is raised or lowered as desired.

Journaled in the lower ends of the U-shaped frame E is the shaft S, upon which is placed the roller F. This roller is made preferably of cast-iron, and of any desired weight, but may be formed of any other material, if thought more desirable. The shaft S, upon which the roller F is placed, has its outer ends journaled in oblong bearings or holes G, made in the lower ends of the U-shaped frame E, and which holes or bearings allow the roller F a vertical movement, for the purpose hereinafter described.

In molding emery-wheels heretofore the material has been compressed in the mold by means of a plunger, and it has been found very difficult by this old method to form a compact and perfect homogeneous mass. I overcome this difficulty by means of the construction herein shown and described, the operation of which is as follows: The frame E, in which the pressing-roller F is journaled, is moved along the beam I from over the mold and table, so as not to be in the way to interfere in any manner with the placing of the material to be compressed in the mold. The bottom P, carrying the greased thin metal plate R, is raised upward within a suitable distance of the top of the mold B, a desired quantity of material placed therein and leveled by means of the top edge of the mold, the plate then lowered any desired distance, and another quantity of the mixture or compound placed in the mold and leveled as before, and this operation continued until the desired quantity of mixture has been placed in the mold. The frame E, carrying the roller F, is then brought in a position directly over the center of the mold B, the material T in the mold raised a little above its upper edge by means of the wheel M, and the frame E lowered until the whole weight of the roller F rests upon the upper end of the mold, or material placed therein, by reason of the oblong holes or bearings G, in which the shaft S is journaled. The roller F is then moved back and forth over the mold or mixture until the mixture is pressed down even with the upper edge of the mold, the mixture then forced upward by means of the wheel M and bottom P, and again compressed by the backward and forward movement of the roller F until the mixture is again forced or compressed even with the upper edge of the mold, the mixture then forced upward again, and again compressed by the backward and forward movement of the roller, and this operation is repeated again and again until a wheel of the required density has been produced. The oblong shape of the bearings G allows the entire weight of the roller to rest upon the mixture within the mold as the frame E is swayed back and forth across the mold. Should the roller F be accidentally pushed beyond the edge of the mold, it cannot fall, but will be held by the bearings G.

An emery-wheel formed by a machine of this construction is found to be very compact, and composed of a perfect homogeneous mass. If desired, a scale may be marked upon the screw-rod L, by means of which wheels of the same thickness may be produced.

I do not limit myself to any particular form of mold, nor to any particular form of a supporting-frame for the roller F, as these may be varied without departing from the spirit of my invention.

Having thus described my invention, I claim—

1. In a machine for molding emery or plastic wheels or disks, the combination, with a mold having an adjustable bottom, whereby the mixture placed in the mold may be raised, as desired, for the purpose described, of a roller for compressing the mixture as it is raised above the mold, substantially as set forth.

2. In a machine for molding emery or plastic disks or wheels, the combination, with the mold having a vertically-adjustable bottom, whereby the mixture placed therein may be raised above the top of the mold, of a compressing-roller adapted to be moved back and forth over the mixture, substantially as and for the purpose described.

3. In a machine for molding emery or plastic disks, the combination, with the supporting frame or table having an opening, of a mold secured to the table over the opening and provided with a vertically-adjustable bottom, and a compressing-roller supported above the mold and adapted to be moved back and forth over the mold for the purpose described, and to be moved from over the mold out of the way, substantially as shown.

4. In a machine for molding emery or other plastic disks, the combination, with the mold having a vertically-adjustable bottom, of a compressing-roller supported above the mold and adapted to be adjusted vertically, for the purpose described.

5. In a machine for molding emery or other plastic wheels, the combination, with the supporting-table A, having an opening, of the mold B, placed over the opening, bottom P, casting K, secured to the under side of the table, screw-rod L, journaled in the casting and passing up through the bottom P, so as to form a center hole in the mixture being molded, and the wheel M, placed upon the rod, by means of which the bottom P may be adjusted vertically, substantially as set forth.

6. The combination, with the table A, having an opening, the casting K, screw-rod L, wheel M, bottom P, and the mold B, of the roller F, frame E, rod D, wheel H, clevis S, roller J, and the beam or supporting-frame I, substantially as specified.

7. The combination of the table A, having an opening, mold B, casting K, screw-rod L, wheel M, bottom P, greased plate R, roller F, shaft S, frame E, having the vertical holes or bearings G, screw-rod D, wheel H, clevis C, roller J, and the supporting-frame I, substantially as described.

8. In a machine for molding emery or other plastic disks, the combination, with a mold having a vertically-adjustable bottom, of a compressing-roller operated upon the top surface of the mold or disk, substantially as set forth.

In testimony whereof I affix my signature in presence of two witnesses.

CHAS. HEATON.

Witnesses:
  I. L. PRUYN,
  H. W. HERRICK.